(12) United States Patent
Kim (10) Patent No.: US 8,412,423 B2
(45) Date of Patent: Apr. 2, 2013

(54) ALARM APPARATUS FOR AUTOMATIC TRANSMISSION USING PEDAL FORCE OF ACCELERATOR PEDAL AND METHOD FOR CONTROLLING THE SAME

(75) Inventor: Eunsik Kim, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/280,761

(22) Filed: Oct. 25, 2011

(65) Prior Publication Data

US 2012/0316739 A1 Dec. 13, 2012

(30) Foreign Application Priority Data

Jun. 10, 2011 (KR) .................. 10-2011-0056134

(51) Int. Cl.
*B60W 10/00* (2006.01)
*B60W 10/10* (2006.01)
*B60W 30/18* (2006.01)

(52) U.S. Cl. .................. 701/53; 180/338; 340/441

(58) Field of Classification Search .................. 701/53, 701/123, 301; 180/338; 340/438, 441
See application file for complete search history.

(56) References Cited

U.S. PATENT DOCUMENTS

| 5,719,767 A * | 2/1998 | Jang ................................ 701/62 |
| 2007/0299612 A1* | 12/2007 | Kimura et al. ................. 701/301 |
| 2008/0174415 A1* | 7/2008 | Tanida et al. ................. 340/438 |
| 2010/0030458 A1* | 2/2010 | Coughlin ...................... 701/123 |

FOREIGN PATENT DOCUMENTS

| KR | 10-0666865 B1 | 1/2007 |
| KR | 10-2009-0063016 A | 6/2009 |
| KR | 10-0949434 B1 | 3/2010 |
| KR | 10-2010-0064786 A | 6/2010 |

\* cited by examiner

*Primary Examiner* — Mary Cheung
*Assistant Examiner* — Brian P Sweeney
(74) *Attorney, Agent, or Firm* — Morgan, Lewis & Bockius LLP (57) ABSTRACT

An alarm apparatus for an automatic transmission may include a transmission control unit (TCU) controlling the automatic transmission of a vehicle, an accelerator pedal unit, a driving unit driving the accelerator pedal unit to perform a predetermined operation, and a control unit interworking with the TCU and controlling the driving unit such that the accelerator pedal unit performs the predetermined operation at a predetermined time before a speed change time, when the speed change time calculated and outputted by the TCU may be inputted to the control unit.

8 Claims, 7 Drawing Sheets

ALARM APPARATUS FOR AUTOMATIC TRANSMISSION USING PEDAL FORCE OF ACCELERATOR PEDAL AND METHOD FOR CONTROLLING THE SAME

CROSS-REFERENCE TO RELATED APPLICATIONS

The present application claims priority to Korean Patent Application Number 10-2011-0056134 filed Jun. 10, 2011, the entire contents of which application is incorporated herein for all purposes by this reference.

BACKGROUND OF THE INVENTION

1. Field of the Invention

The present invention relates to an alarm apparatus for an automatic transmission, which gives an alarm to a user through an accelerator pedal, and a method for controlling the same, and more particularly, to an alarm apparatus for an automatic transmission, which transmits tactile information through an accelerator pedal to a vehicle provided with the automatic transmission.

2. Description of Related Art

An automatic transmission automatically controls each shift stage of a vehicle by using the operating speed and an accelerator position sensor (APS) value of the vehicle and is controlled by a transmission control unit (TCU). In general, a kick-down shift is applied to such an automatic transmission, and a kick-down manipulation mechanism for transmitting a shift feel to a user through an accelerator pedal is mounted on an accelerator pedal module or the floor inside the vehicle.

However, the mounting of the kick-down manipulation mechanism makes the design of the accelerator pedal complex. Furthermore, as a groove for the mounting space of the kick-down manipulation mechanism is formed in a pedal arm forming the accelerator pedal, the stiffness of the accelerator pedal may be reduced.

Further, the conventional kick-down manipulation mechanism is operated only at an APS opening degree of 80%, and is not operated at lower positions. Therefore, the conventional kick-down manipulation mechanism has difficulties in minimizing a shift shock which may be transmitted to a user during each transmission step.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an alarm apparatus for an automatic transmission capable of excluding a kick-down manipulation mechanism applied to a vehicle of a conventional automatic transmission, and a method for controlling the same.

Further, various aspects of the present invention are directed to providing an alarm apparatus for an automatic transmission capable of minimizing a shift shock which may be transmitted to a user by an automatic shift, and a method for controlling the same.

In an aspect of the present invention, the alarm apparatus for an automatic transmission may include a transmission control unit (TCU) controlling the automatic transmission of a vehicle, an accelerator pedal unit, a driving unit driving the accelerator pedal unit to perform a predetermined operation, and a control unit interworking with the TCU and controlling the driving unit such that the accelerator pedal unit performs the predetermined operation at a predetermined time before a speed change time, when the speed change time calculated and outputted by the TCU may be inputted to the control unit.

When the accelerator pedal unit performs the predetermined operation, the TCU determines whether an accelerator position sensor (APS) value may be increased or not by using positional information inputted from an APS installed in the vehicle after the predetermined operation, generates a change control signal for changing a shift stage of the automatic transmission or a maintenance control signal for maintaining a current shift stage of the automatic transmission, based on a determination result of whether the APS value increased or not, and controls the automatic transmission.

The predetermined operation may include one of a vibration mode for transmitting vibrations to a user, a repulsive mode for consecutively transmitting a constant repulsive force to a user, and a tick mode for transmitting an instant repulsive force to a user.

Driving unit may include a driving actuator, a connection mechanism transmitting a driving force of the driving actuator to the accelerator pedal unit, and a position sensor sensing a position of the connection mechanism based on the driving of the driving actuator, wherein the control unit controls the driving actuator by using positional information inputted from the position sensor such that the driving force of the driving actuator may be transmitted to the accelerator pedal unit through the connection mechanism and the accelerator pedal unit performs the predetermined operation.

The alarm apparatus may further include a user input unit selecting whether or not to deactivate an operation of the alarm apparatus of the automatic transmission, wherein when the deactivation may be selected through the user input unit, the control unit controls the connection mechanism to be spaced at a preset initial position from the driving actuator by using the positional information inputted from the position sensor such that a driving force of the driving actuator may not be transmitted to the connection mechanism.

The alarm apparatus may further include a user input unit selecting whether or not to deactivate an operation of the alarm apparatus of the automatic transmission, wherein when the deactivation may be selected through the user input unit before the controlling of the driving unit, the control unit deactivates the driving unit.

In another aspect of the present invention, a method for controlling an alarm apparatus for an automatic transmission may include a driving unit driving an accelerator pedal unit of a vehicle and a control unit interworking with a transmission control unit (TCU) of the automatic transmission to control the driving unit, the method including controlling, by the control unit, the driving unit such that the accelerator pedal unit performs a predetermined operation at a predetermined time before a speed change time, when the speed change time calculated and outputted by the TCU may be received, determining, by the TCU, whether an accelerator position sensor (APS) value may be increased or not by using positional information inputted from an APS installed in the vehicle, when the accelerator pedal unit performs the predetermined operation, and generating, by the TCU, a change control signal for changing a shift stage of the automatic transmission or a maintenance control signal for maintaining a current shift stage of the automatic transmission, based on the determination result of whether the APS value increased or not, and controlling the automatic transmission.

The predetermined operation may include one of a vibration mode for transmitting vibrations to a user, a repulsive mode for consecutively transmitting a constant repulsive force to a user, and a tick mode for transmitting an instant repulsive force to a user, wherein the driving unit may include a driving actuator, a connection mechanism transmitting a driving force of the driving actuator to the accelerator pedal unit, and a position sensor sensing the position of the connection mechanism based on the driving of the driving actuator, wherein the control unit controls the driving actuator by using the positional information inputted from the position sensor such that the driving force of the driving actuator may be transmitted to the accelerator pedal unit through the connection mechanism and the accelerator pedal unit performs the predetermined operation.

The method may further include deactivating, by the control unit, the operation of the driving unit, when deactivation of the alarm apparatus of an automatic transmission may be selected through a user input unit, before the controlling of the driving unit.

As such, since the alarm apparatus for the automatic transmission according to the exemplary embodiment of the present invention includes the mechanism capable of providing a preset pedal force through the accelerator pedal unit, a kick-down manipulation mechanism for generating a shift feel does not need to be additionally mounted. Therefore, the layout of the accelerator pedal may be simplified, the stiffness of the accelerator pedal may be increased, and the manufacturing cost may be reduced.

Further, the alarm apparatus for the automatic transmission according to the exemplary embodiment of the present invention transmits an alarm through the accelerator pedal unit before a speed change is performed by the automatic transmission. Therefore, a user may select whether to change the speed by further stepping on the accelerator pedal or to maintain a current shift stage. Accordingly, it is possible to minimize a shock which occurs due to the speed change.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an alarm apparatus for an automatic transmission according to an exemplary embodiment of the present invention and a method of controlling the same will be described with reference to the accompanying drawings.

Figure 1:
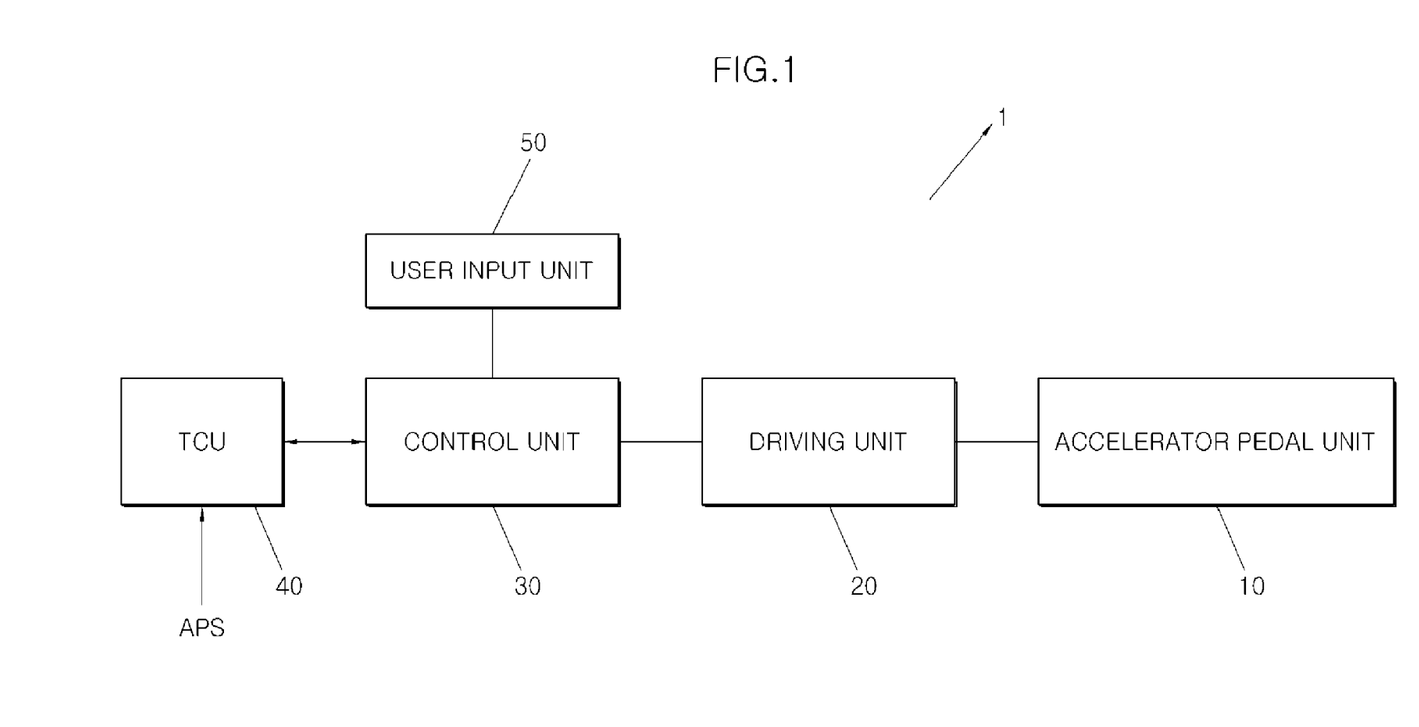
FIG. 1 is a block diagram of an alarm apparatus for an automatic transmission according to an exemplary embodiment of the present invention.

Referring to FIG. 1, an alarm apparatus 1 for an automatic transmission according to an exemplary embodiment of the present invention will be described. FIG. 1 is a block diagram of the alarm apparatus for the automatic transmission according to an exemplary embodiment of the present invention. As shown in FIG. 1, alarm apparatus 1 for the automatic transmission according to the exemplary embodiment of the present invention, which is used in a vehicle provided with the automatic transmission, may include an accelerator pedal unit 10 of the vehicle, a driving unit 20, a control unit 30, a transmission control unit (TCU) 40, and a user input unit 50.

Alarm apparatus 1 for the automatic transmission according to the exemplary embodiment performs an operation of giving an alarm to a user through accelerator pedal unit 10 immediately before the speed is changed by the automatic transmission mounted in the vehicle. Alarm apparatus 1 for the automatic transmission may monitor a user's reaction applied through accelerator pedal unit 10 after the alarm, determine whether to change the speed or maintain the current state, and then control the automatic transmission through TCU 40.

Accelerator pedal unit 10 is turned by a user's stepping motion, and the opening degree (APS value) of a throttle valve is increased or decreased in response to the turning of accelerator pedal unit 10. Such an APS value may be sensed by an APS and then inputted to TCU 40. In another exemplary embodiment, the APS value may be transmitted from an engine control unit (ECU) through CAN or serial communication.

Figure 2:
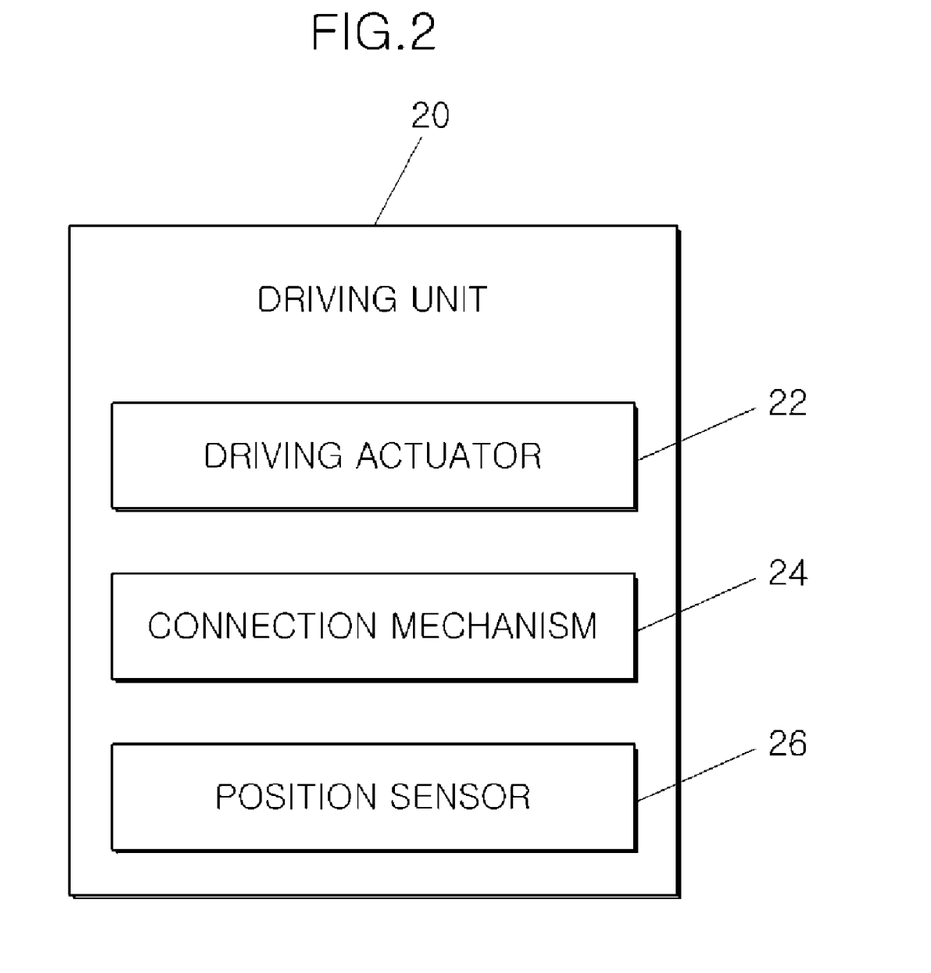
FIG. 2 is a block diagram of a driving unit according to an exemplary embodiment of the present invention.

Driving unit 20 is driven by a control signal of control unit 30. As shown in FIG. 2, driving unit 20 may include a driving actuator 22, a connection mechanism 24, and a position sensor 26. Driving actuator 22 serves to generate a driving force, connection mechanism 24 serves to transmit the driving force of driving actuator 22 to accelerator pedal unit 10, and position sensor 26 serves to sense the position of connection mechanism 24 based on the driving of the driving actuator 22.

Driving actuator 22 may include a both direction solenoid motor, a forward direction solenoid motor, or a linear motor. Connection mechanism 24 may include a power transmission rod for transmitting a rectilinear motion of driving actuator 22 and a pedal arm for converting the rectilinear motion of the power transmission rod into a rotary motion. Position sensor 26 may include a hall sensor, and senses the position of connection mechanism 24 corresponding to the motion of accelerator pedal unit 10 and transmits the sensed position to control unit 30. Through the transmitted position, control unit 30 may understand a relative position of connection mechanism 24 with respect to driving actuator 22.

Control unit 30 interworks with TCU 40, and controls driving unit 20 by using a speed change time inputted from TCU 40 and user's information requirements inputted through user input unit 50.

Specifically, control unit 30 controls driving actuator 22 by using the positional information inputted from position sensor 26 such that the driving force of driving actuator 22 is transmitted to accelerator pedal unit 10 through connection mechanism 24. Then, accelerator pedal unit 10 performs a predetermined operation.

Figure 3:
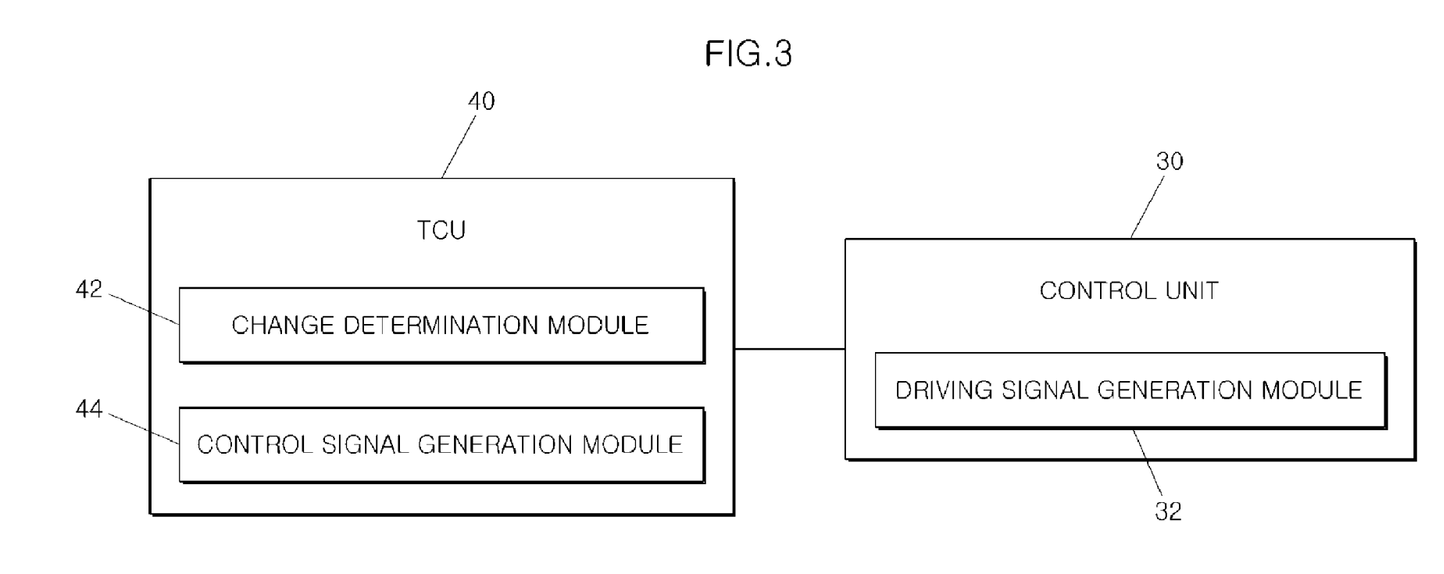
FIG. 3 is a block diagram of a control unit and a TCU according to an exemplary embodiment of the present invention.
Figure 4A:
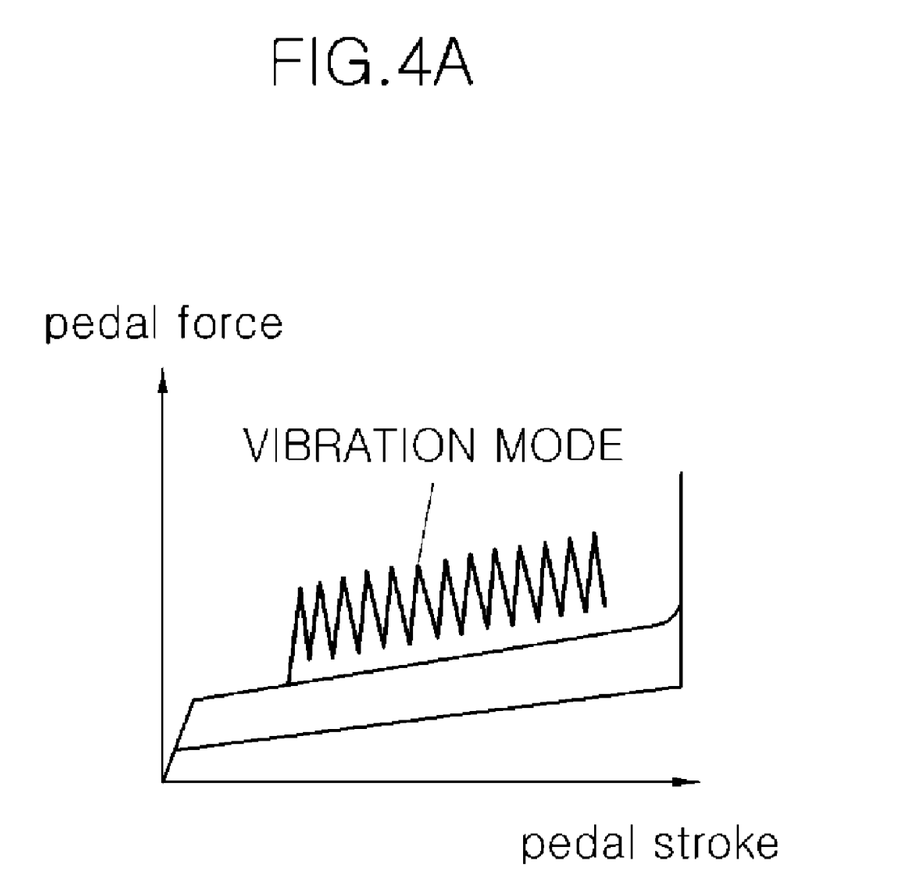
FIGS. 4A, 4B, and 4C are graphs for explaining the operation of the alarm apparatus for the automatic transmission according to exemplary embodiments of the present invention.
Figure 4B:
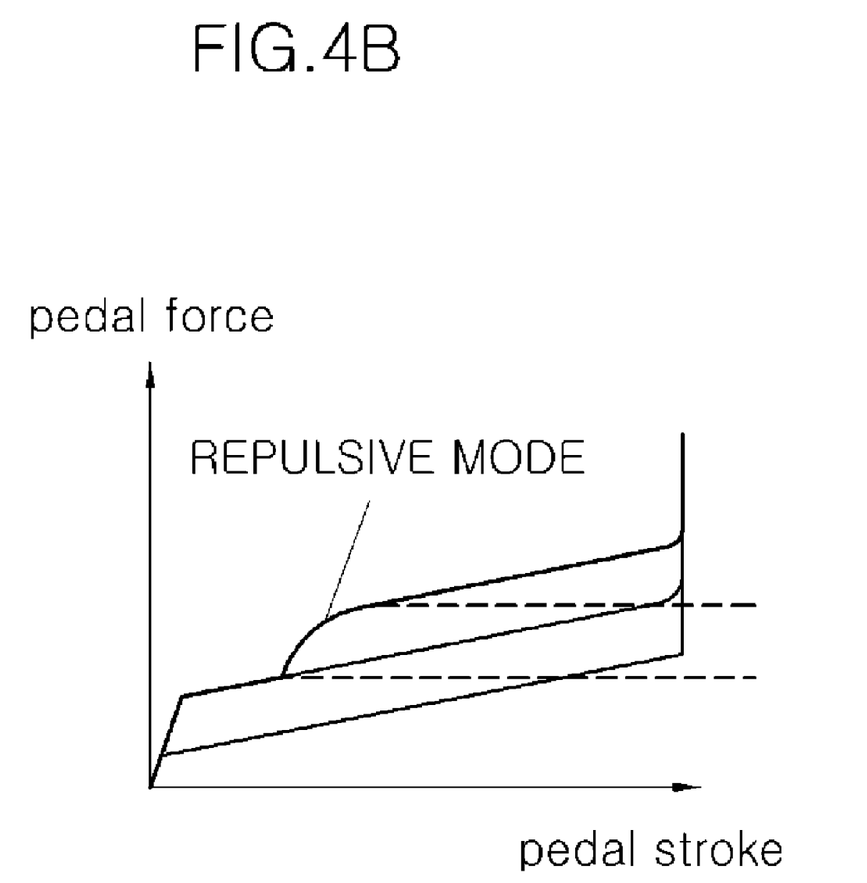
Figure 4C:
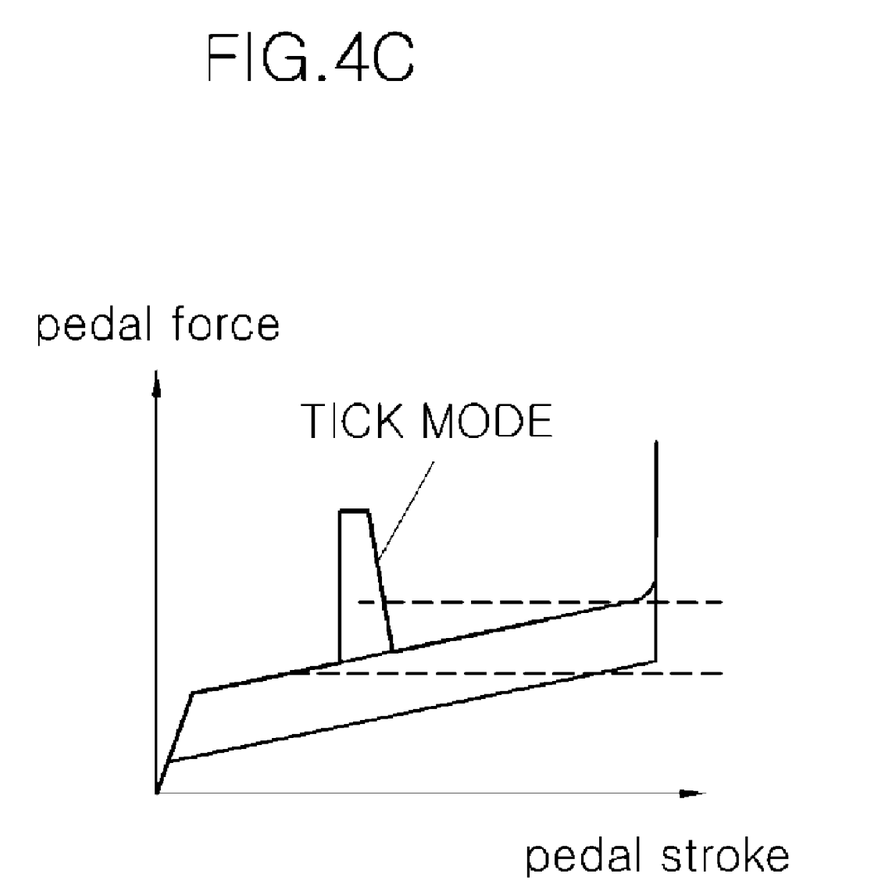

Hereinafter, referring to FIGS. 3 and 4A, 4B, and 4C, the operations of control unit 30 and TCU 40 which interwork with each other will be described in detail. FIG. 3 is a function block diagram of the control unit and the TCU according to the exemplary embodiment of the present invention. FIGS. 4A, 4B, and 4C are graphs for explaining the operation of the alarm apparatus for the automatic transmission according to exemplary embodiments of the present invention.

Control unit 30 and TCU 40 control the overall operation according to the exemplary embodiment of the present invention, and interwork with each other. As shown in FIG. 3, control unit 30 may include a driving signal generation module 32 in relation with a characteristic function according to the exemplary embodiment of the present invention, and TCU 40 may be divided into a change determination module 42 and a control signal generation module 44.

When a speed change time calculated by TCU 40 is inputted, driving signal generation module 32 of control unit 30 generates a driving signal and outputs the generated driving signal to driving unit 20 such that accelerator pedal unit 10 performs a predetermined operation at a predetermined time before the inputted speed change time.

When accelerator pedal unit 10 performs the predetermined operation according to the driving signal generated by driving signal generation module 32, control unit 30 monitors the performance result and transmits a signal corresponding to the performance result to TCU 40.

Specifically, control unit 30 determines whether or not the inputted speed change time arrives before the predetermined time by using an internal timer and an internal calculator. The predetermined operation performed by accelerator pedal unit 10 may be decided when accelerator pedal unit 10 is manufactured or by a user's setting after accelerator pedal unit 10 is manufactured. For example, the predetermined operation may be decided as one of operation modes shown in FIGS. 4A, 4B, and 4C.

FIG. 4A shows a vibration mode for transmitting vibrations to a user through accelerator pedal unit 10. FIG. 4B shows a repulsive mode for consecutively transmitting a constant repulsive force to a user. FIG. 4C shows a tick mode for transmitting an instant repulsive force to a user.

As such, alarm apparatus 1 for the automatic transmission according to the exemplary embodiment of the present invention includes the mechanism capable of providing a preset pedal force through accelerator pedal unit 10. Therefore, a kick-down manipulation mechanism for generating a shift feel does not need to be additionally mounted.

That is, the kick-down manipulation mechanism refers to a mechanism mounted on an accelerator pedal module or the floor inside a vehicle. In alarm apparatus 1 for the automatic transmission according to the exemplary embodiment, the kick-down manipulation mechanism is omitted. Therefore, it is possible to simplify the layout of the accelerator pedal. Accordingly, the stiffness of the accelerator pedal may be increased, and the manufacturing cost may be reduced. Furthermore, the alarm apparatus may be used for a pedal force generation mechanism related to an echo function.

After a signal corresponding to the operation result of accelerator pedal unit 10 is received from control unit 30, that is, after the predetermined operation is performed by accelerator pedal unit 10, change determination module 42 of TCU 40 determines whether an APS value increased or not by using positional information inputted from an APS installed in the vehicle.

When determining that the APS value increased, change determination module 42 determines that accelerator pedal unit 10 was further stepped on by a user. On the other hand, when determining that the APS value did not increase, that is, the APS value decreased or was not changed, change determination module 42 determines that accelerator pedal unit 10 was not further stepped on by a user.

Control signal generation module 44 generates a change control signal for changing a shift stage of the automatic transmission or a maintenance control signal for maintaining a current shift stage of the automatic transmission, based on the determination result of whether the APS value increased or not, by change determination module 34, and controls the automatic transmission.

When it is determined that accelerator pedal unit 10 was further stepped on, control signal generation module 36 generates a change control signal for changing the shift stage of the automatic transmission. On the other hand, when it is determined that accelerator pedal unit 10 was not further stepped on, control signal generation module 44 generates a maintenance control signal for maintaining the current shift stage of the automatic transmission.

Figure 5:
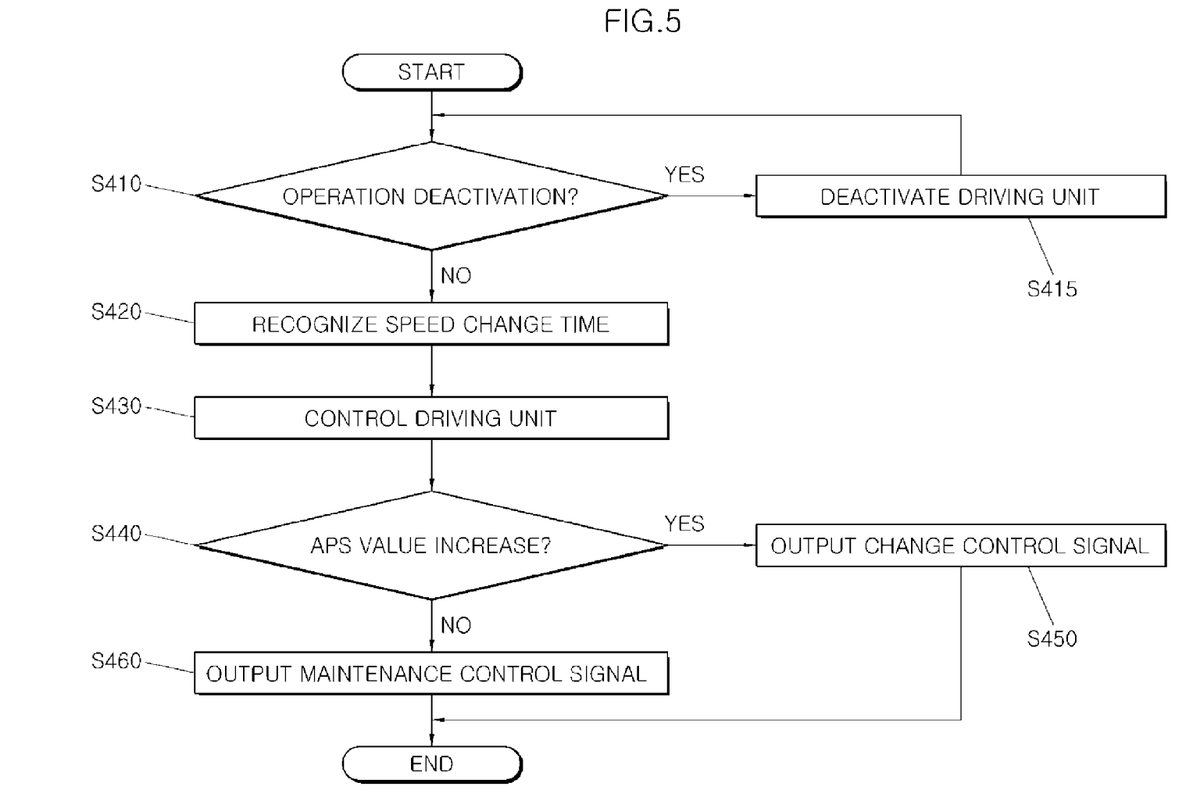
FIG. 5 is a control flow chart of the alarm apparatus for the automatic transmission according to an exemplary embodiment of the present invention.

Hereinafter, the operation of alarm apparatus 1 for the automatic transmission according to an exemplary embodiment of the present invention will be described with reference to FIG. 5, and the following descriptions will be focused on control unit 30 and TCU 40. Steps S410 to S430 of FIG. 5 are performed by control unit 30, and steps S440 to S460 are performed by TCU 40 after the step S430.

First, control unit 30 determines whether or not to deactivate the operation of alarm apparatus 1 for the automatic transmission according to the exemplary embodiment of the present invention is selected through user input unit 50 (S410).

When determining that the deactivation was selected by a user, control unit 30 deactivates the operation of driving unit 20 (S415). That is, when determining that the deactivation was selected at the step S410, control unit 30 may control driving unit 20 by using the positional information sensed by position sensor 26 such that connection mechanism 24 is not driven by driving actuator 22 and thus maintains a spaced initial position.

When determining that the deactivation was not selected by the user at the step S410, control unit 30 receives a speed change time from TCU 40 and recognizes the speed change time (S420). Then, control unit 30 generates a control signal to control driving unit 20 such that accelerator pedal unit 10 performs one of the operation modes shown in FIG. 4 at a predetermined time before the recognized speed change time (S430).

After accelerator pedal unit 10 performs one of the operation modes of FIG. 4 at the step S430, that is, after a signal informing that accelerator pedal unit 10 performed a predetermined operation is received from control unit 30, TCU 40 determines whether the APS value increases or not, based on positional information inputted from the APS (S440).

When determining that the APS increased, TCU 40 generates a change control signal for changing a shift stage of the automatic transmission, and controls the automatic transmission (S450). On the other hand, when determining that the APS did not increase, TCU 40 generates a maintenance control signal for maintaining the shift stage of the automatic transmission, and controls the automatic transmission (S460).

As such, alarm apparatus 1 for the automatic transmission according to the exemplary embodiment of the present invention transmits an alarm through accelerator pedal unit 10 before the speed change is performed by the automatic transmission. Therefore, a user may select whether to change the speed by further stepping on the accelerator pedal or to maintain a current shift stage. Accordingly, it is possible to minimize a shock which occurs due to the speed change.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An alarm apparatus for an automatic transmission, comprising:
   a transmission control unit (TCU) controlling the automatic transmission of a vehicle;
   an accelerator pedal unit;
   a driving unit driving the accelerator pedal unit to perform a predetermined operation; and
   a control unit interworking with the TCU and controlling the driving unit such that the accelerator pedal unit performs the predetermined operation at a predetermined time before a speed change time, when the speed change time calculated and outputted by the TCU is inputted to the control unit;
   wherein the driving unit includes:
   a driving actuator;
   a connection mechanism transmitting a driving force of the driving actuator to the accelerator pedal unit; and
   a position sensor sensing a position of the connection mechanism based on the driving of the driving actuator; and
   wherein the control unit controls the driving actuator by using positional information inputted from the position sensor such that the driving force of the driving actuator is transmitted to the accelerator pedal unit through the connection mechanism and the accelerator pedal unit performs the predetermined operation.

2. The alarm apparatus as defined in claim 1, wherein, when the accelerator pedal unit performs the predetermined operation, the TCU determines whether an accelerator position sensor (APS) value is increased or not by using positional information inputted from an APS installed in the vehicle after the predetermined operation, generates a change control signal for changing a shift stage of the automatic transmission or a maintenance control signal for maintaining a current shift stage of the automatic transmission, based on a determination result of whether the APS value increased or not, and controls the automatic transmission.

3. The alarm apparatus as defined in claim 1, wherein the predetermined operation includes one of a vibration mode for transmitting vibrations to a user, a repulsive mode for consecutively transmitting a constant repulsive force to a user, and a tick mode for transmitting an instant repulsive force to a user.

4. The alarm apparatus as defined in claim 1, further including a user input unit selecting whether or not to deactivate an operation of the alarm apparatus of the automatic transmission,
   wherein when the deactivation is selected through the user input unit, the control unit controls the connection mechanism to be spaced at a preset initial position from the driving actuator by using the positional information inputted from the position sensor such that a driving force of the driving actuator is not transmitted to the connection mechanism.

5. The alarm apparatus as defined in claim 1, further including a user input unit selecting whether or not to deactivate an operation of the alarm apparatus of the automatic transmission,
   wherein when the deactivation is selected through the user input unit before the controlling of the driving unit, the control unit deactivates the driving unit.

6. A method for controlling an alarm apparatus for an automatic transmission, which includes a driving unit driving an accelerator pedal unit of a vehicle and a control unit interworking with a transmission control unit (TCU) of the automatic transmission to control the driving unit, the method including:
   controlling, by the control unit, the driving unit such that the accelerator pedal unit performs a predetermined operation at a predetermined time before a speed change time, when the speed change time calculated and outputted by the TCU is received;
   determining, by the TCU, whether an accelerator position sensor (APS) value is increased or not by using positional information inputted from an APS installed in the vehicle, when the accelerator pedal unit performs the predetermined operation; and
   generating, by the TCU, a change control signal for changing a shift stage of the automatic transmission or a maintenance control signal for maintaining a current shift stage of the automatic transmission, based on the determination result of whether the APS value increased or not, and controlling the automatic transmission;
   wherein the driving unit includes:
   a driving actuator;
   a connection mechanism transmitting a driving force of the driving actuator to the accelerator pedal unit; and
   a position sensor sensing the position of the connection mechanism based on the driving of the driving actuator; and
   wherein the control unit controls the driving actuator by using the positional information inputted from the position sensor such that the driving force of the driving actuator is transmitted to the accelerator pedal unit through the connection mechanism and the accelerator pedal unit performs the predetermined operation.

7. The method as defined in claim 6, wherein the predetermined operation includes one of a vibration mode for transmitting vibrations to a user, a repulsive mode for consecutively transmitting a constant repulsive force to a user, and a tick mode for transmitting an instant repulsive force to a user.

8. The method as defined in claim 6, further including deactivating, by the control unit, the operation of the driving unit, when deactivation of the alarm apparatus of an automatic transmission is selected through a user input unit, before the controlling of the driving unit.

* * * * *